L. K. ANDERSON.
EMERGENCY BRAKE.
APPLICATION FILED SEPT. 16, 1913.
1,117,753.
Patented Nov. 17, 1914.
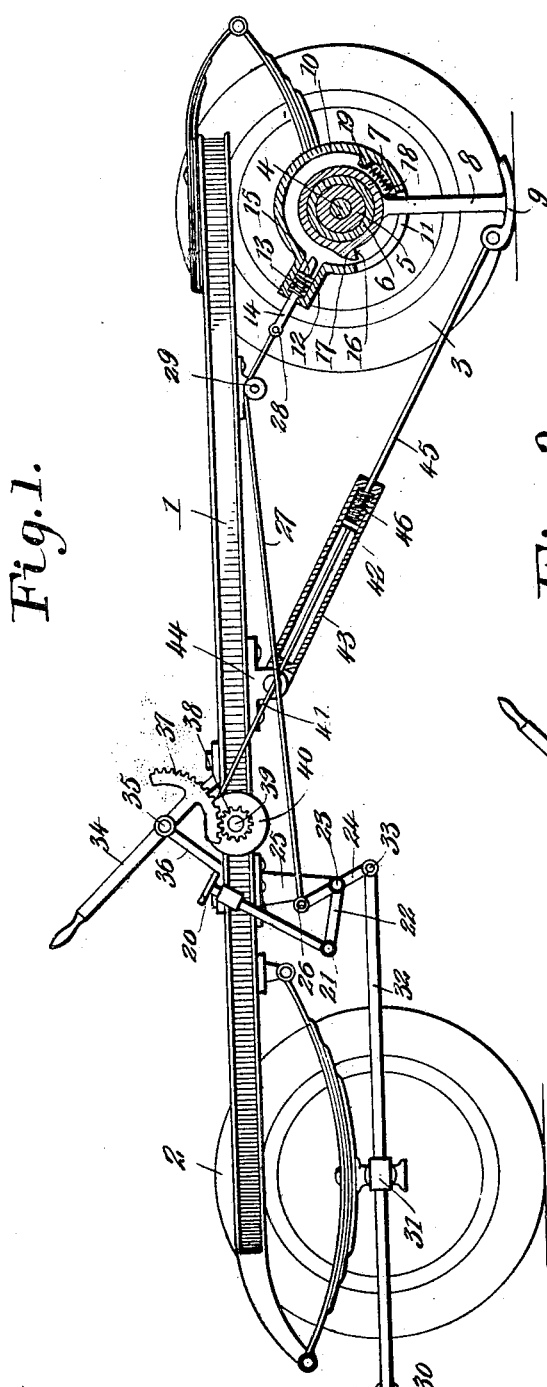
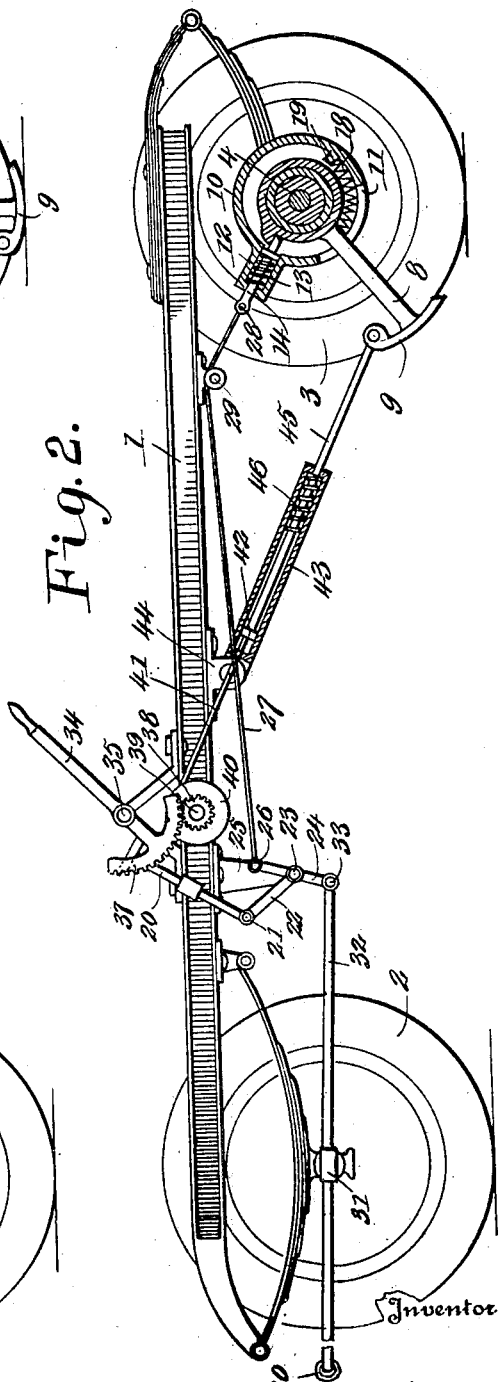

UNITED STATES PATENT OFFICE.

LAUST K. ANDERSON, OF WEST ALLIS, WISCONSIN.

EMERGENCY-BRAKE.

1,117,753.  Specification of Letters Patent.  Patented Nov. 17, 1914.

Application filed September 16, 1913. Serial No. 790,054.

*To all whom it may concern:*

Be it known that I, LAUST K. ANDERSON, citizen of Denmark, Europe, residing at West Allis, in the county of Milwaukee and State of Wisconsin, have invented certain new and useful Improvements in Emergency-Brakes, of which the following is a specification.

This invention relates to vehicles generally, and the principal object of the invention is to provide a safety stop or emergency brake which will enable the vehicle to be stopped instantly to prevent collisions, skidding or other vehicle trouble.

A further object of the invention is to render the mechanism operative through the medium of a suitable bumper at the forward end of the vehicle.

A still further object of the invention contemplates the provision of specially devised brake mechanism wherein an oscillatable brake shoe may be swung into and out of engagement with the ground over which the vehicle is traveling and directly beneath the power wheels of the vehicle to slightly elevate the latter and disengage the wheels from the ground, the wheels when elevated adapted to continue rotation without imparting movement to the vehicle and without injury to the driving mechanism thereof.

The invention still further resides in the provision of means in the nature of a suitable drum, cylinder and piston for withdrawing the brake shoe from engagement with the ground when it is desired that the machine or vehicle should again be driven in a forward direction.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings, wherein like characters denote like or corresponding parts throughout the several views, and in which:—

Figure 1 is a side elevation of a vehicle frame with the mechanism comprising my invention attached thereto and swung into operative position; and Fig. 2 is a similar view showing the device inoperative.

Before proceeding with the description of the drawings I desire to call particular attention to the fact that while I have evolved my invention with particular reference to its application in connection with motor vehicles, the same may be readily utilized as an emergency brake for various other vehicles such as carriages, wagons, etc.

Referring now to the drawings, wherein is illustrated the preferred embodiment of my invention the numeral 1 designates the vehicle frame having the usual wheels 2 mounted for rotation at the forward end thereof and the power wheels 3 at the rear end thereof, the latter being carried by the rear axle 4. Keyed or otherwise fixedly secured to the axle is a suitable sleeve 5, the latter being inclosed by a second sleeve 6 loosely mounted thereupon. Embracing the second sleeve 6 is a band or collar 7 having an arm 8 formed integrally therewith, the latter adapted to extend to a point adjacent the periphery of the wheels 3. Either formed integrally with the arm 8 or secured thereto in any suitable manner is a brake shoe 9, which when in operative position, is swung into engagement with the ground over which the vehicle is traveling to slightly elevate the wheels 3 as illustrated to advantage in Fig. 1 of the drawings.

A casing 10 is arranged to inclose the band or collar 7 of the brake mechanism, the said casing having an arcuate slot or opening 11 formed therein through which the arm 8 of the brake shoe extends. An offset portion 12 is formed integrally with the casing 10, adjacent the opening 11, within which a spring 13 is seated the latter being disposed to embrace a suitable pawl 14 having a flange 15 formed thereupon against which one end of the spring 13 abuts. A shoulder 16 is formed upon the band or collar 7 t an enlargement 17, the said shoulder being normally engaged by the pawl 14 to maintain the brake shoe 9 out of engagement with the ground. To swing the said shoe into operative position, a spring 18 is provided, one end of the spring being secured to the arm 8 of the shoe and the opposite end to a lug 19 formed upon the inner periphery of the casing 10.

Passing on to the mechanism employed for operating the brake shoe I provide a foot lever 20 arranged conveniently upon the vehicle body or frame 1 and pivotally connected as at 21 to a link 22 in turn fixedly secured as at 23 to an operating lever 24, the latter being supported through the medium of a bracket 25 depending from the under side of the said frame 1. The said operating lever 24 is pivoted centrally at the point 23, one end of the lever being connected as at 26 to a suitable flexible member 27, the opposite end of which is secured as at 28 to the pawl 14. A roller or pulley 29 may be provided, over which the flexible element 27 rides. In emergency cases, the said operating lever 24 is actuated through the medium of a bumper 30 mounted for sliding movement at the forward end of the vehicle by means of bearings 31 provided therefor, the bearings supporting suitable rods 32, the forward ends of which are connected to the bumper 30 and the opposite ends to the said lever 24 as at 33.

In operation, when it is desired that the emergency brake should be applied, the foot lever 20 is depressed thereby causing the operating lever 24 to be actuated and the pawl 14 withdrawn from engagement with the shoulder 16 of the band 7, the spring 18, taken in connection with the weight of the shoe 9, causing the latter to fall or swing into engagement with the ground directly beneath the power wheels 3 of the vehicle, causing the latter to be slightly elevated and instantly stopping the forward movement of the machine without in any way interfering with the driving power or mechanism of the said wheels. The said lever 24 may be also actuated by the sliding movement of the bumper designated as an entirety by the numeral 30, the operation in this instance being obvious upon application to the drawing.

Having described fully the manner in which the brake shoe 9 is swung into operative position, it now remains to describe the manner in which the same is withdrawn or swung into inoperative position. A hand lever 34 is pivoted as at 35 to a bracket or other similar element 36, the said lever 34 terminating at one end in a segmental rack or quadrant 37, the teeth of which mesh into a pinion 38 mounted for rotation upon and with a shaft 39, the latter having a drum 40 mounted thereupon over which a cable or other flexible element 41 is wound, one end of the said cable being secured to a piston 42 disposed within a suitable cylinder 43 supported beneath the vehicle frame by means of a casting 44. A piston rod 45 is secured to the piston 42 at one end and to the brake shoe 9 at the other thereby causing the said shoe to be withdrawn from engagement with the ground as the said piston 42 is moved upwardly or forwardly within the cylinder. A spring 46 is interposed between the piston 42 and the lower or rear closed end of the cylinder 43 to serve as a cushion for the former during the operation of the brake mechanism above described.

When it is desired that the shoe 9 be withdrawn from engagement with the ground and the wheels 3 returned to their normal position, the hand lever 34 is operated causing the drum 40 to be revolved thereby actuating the piston rod 45 and oscillating the brake shoe 9 in the desired manner.

From the above, taken in connection with the accompanying drawings, it will be seen that the vehicle may be instantly stopped by the application of the emergency brake; that the tension of the spring 18 is sufficient to swing the hand lever 34 from the position shown in Fig. 2 to the position shown in Fig. 1 of the drawings, thereby automatically conditioning the said lever to permit disengagement of the shoe 9 when necessary; and that the operation of the brake shoe may be operated either by the manipulation of the foot lever 20 or the bumper 30 as hereinbefore fully set forth.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. An emergency brake for vehicles including a brake shoe, a casing therefor having an opening formed therein through which said shoes extends, a pawl carried by said casing adapted to normally engage said shoe to maintain the latter in inoperative position, and means connected to the said pawl for actuating the latter and releasing said shoe, as and for the purpose set forth.

2. In an emergency brake for vehicles, a brake shoe, a casing therefor, said casing having an opening through which said shoe extends, a movable pawl carried by said casing and normally engaging said shoe to maintain the same inoperative, a bumper projecting forwardly of the vehicle, an operating lever, and means connecting said bumper and said operating lever to said pawl whereby the latter may be disengaged from said shoe to permit application of the emergency brake upon actuation of either the bumper or the said lever, as and for the purpose set forth.

3. An emergency brake for vehicles including a brake shoe, a casing therefor having an opening formed therein through which the said shoe extends, a spring actuated pawl carried by the said casing adapted to normally engage the said shoe to maintain the latter in an inoperative position, and means including a plurality of links and levers connected to the said pawl for actuating the latter and releasing the said shoe, as and for the purpose set forth.

4. In combination with a vehicle, an emergency brake therefor including a movable brake shoe carried by one of the axles of the said vehicle, a casing having an opening formed therein through which the said shoe extends, a spring actuated pawl carried by the said casing adapted to normally engage a shoulder formed upon the said shoe to normally maintain the latter in an inoperative position, a spring disposed within the said casing and connected to the said shoe for swinging the latter into operative position when released by the said pawl, and means including a plurality of links and levers carried by the said vehicle and connected to the said pawl for actuating the latter, as and for the purpose set forth.

5. In combination with a wheeled vehicle, brake mechanism therefor including a band carried by one of the axles of the said vehicle, an arm depending from the said band, a brake shoe carried by the said arm, a casing arranged to embrace the said band, the said casing having an opening formed therein through which the said arm extends, a spring actuated pawl carried by the said casing adapted to normally engage a shoulder formed upon the said band to maintain the said shoe in an inoperative position, a spring disposed within the said casing and connected to the said arm for swinging the said shoe into operative position when released by the said pawl and a plurality of links and levers carried by the said vehicle and connected to the said pawl for actuating the latter, as and for the purpose set forth.

6. An emergency brake for vehicles including a brake shoe oscillatable about one of the vehicle axles to raise and lower the wheels upon said axle respectively out of and into engagement with the ground, a lug projecting from said shoe, a spring pressed pawl normally engaging said lug to render the shoe inoperative, spring means engaging the shoe for holding the lug in engagement with the pawl, means actuatable to withdraw the pawl from engagement with the shoe, and means actuatable to withdraw the shoe from engagement with the ground when actuated, as and for the purpose set forth.

In testimony whereof I affix my signature in presence of two witnesses.

LAUST K. ANDERSON.

Witnesses:
A. G. ROBISCH,
J. L. CHRISTENSEN.